(12) United States Patent
Harano et al.

(10) Patent No.: US 6,317,185 B1
(45) Date of Patent: Nov. 13, 2001

(54) LIQUID CRYSTAL DISPLAY APPARATUS

(75) Inventors: Yuuichi Harano; Kenichi Chahara, both of Hitachi; Kenichi Onisawa, Hitachinaka; Nobuyuki Suzuki; Masaru Takabatake, both of Mobara; Toshiki Kaneko, Chiba, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/322,151

(22) Filed: May 28, 1999

(30) Foreign Application Priority Data

May 29, 1998 (JP) .................................................. 10-148688

(51) Int. Cl.[7] .................................................. G02F 1/1343
(52) U.S. Cl. .................................................. 349/147
(58) Field of Search .................................... 349/147, 139, 349/43, 46; 257/59; 438/30

(56) References Cited

U.S. PATENT DOCUMENTS

| | | | | |
|---|---|---|---|---|
| 5,852,481 | * | 12/1998 | Hwang | 349/43 |
| 6,081,308 | * | 6/2000 | Jeong et al. | 349/42 |
| 6,219,124 | * | 4/2001 | Lee et al. | 349/147 |

* cited by examiner

Primary Examiner—William L. Sikes
Assistant Examiner—Julie H Ngo
(74) Attorney, Agent, or Firm—Antonelli, Terry, Stout & Kraus, LLP

(57) ABSTRACT

A liquid crystal display apparatus is high in manufacturing yield because defects caused by short-circuiting between the electrodes are eliminated. The liquid crystal display apparatus employs films made of an Al—Nd alloy of Nd content of 1 to 4.5 wt % in at least one of the gate wiring and the data wiring.

18 Claims, 11 Drawing Sheets

FIG. 6

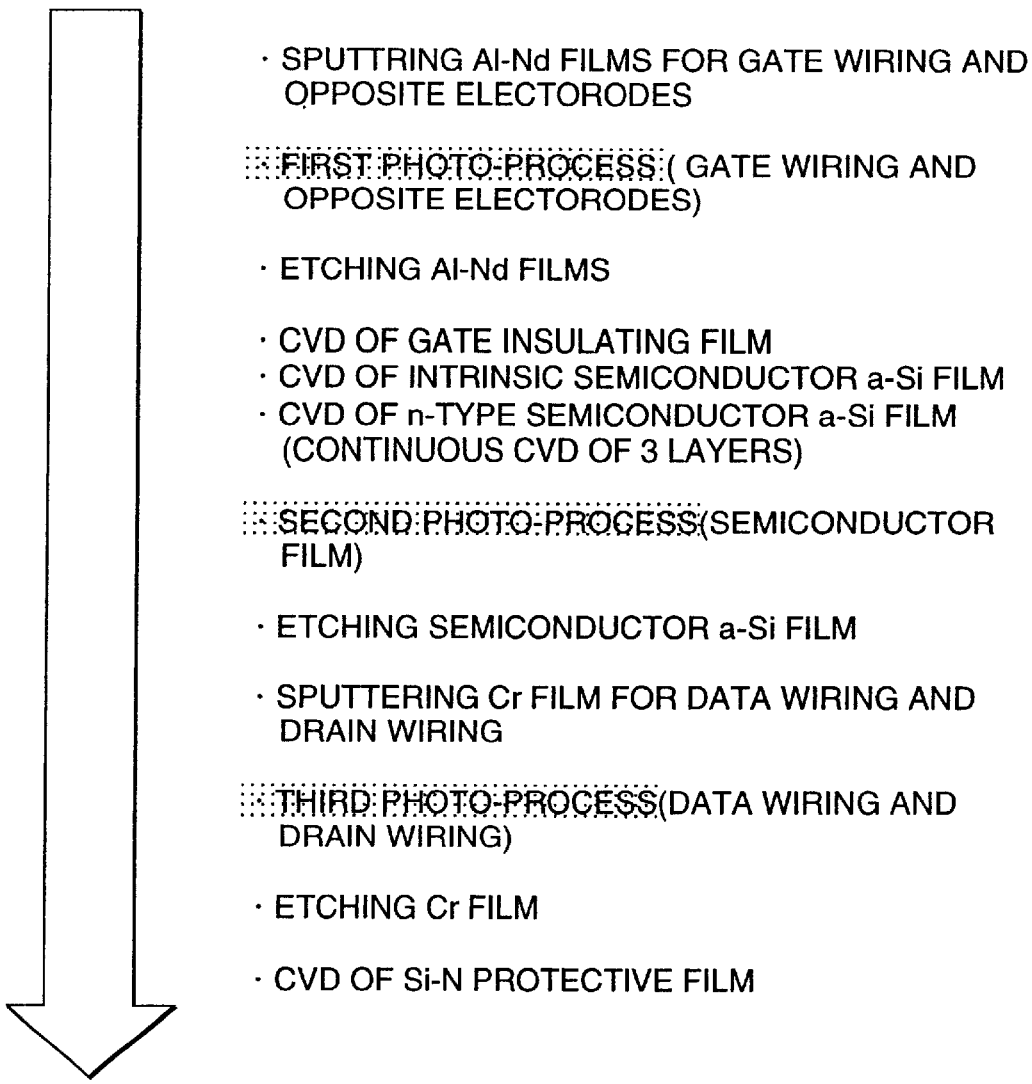

- SPUTTRING Al-Nd FILMS FOR GATE WIRING AND OPPOSITE ELECTORODES

- FIRST PHOTO-PROCESS ( GATE WIRING AND OPPOSITE ELECTORODES)

- ETCHING Al-Nd FILMS

- CVD OF GATE INSULATING FILM
- CVD OF INTRINSIC SEMICONDUCTOR a-Si FILM
- CVD OF n-TYPE SEMICONDUCTOR a-Si FILM (CONTINUOUS CVD OF 3 LAYERS)

- SECOND PHOTO-PROCESS(SEMICONDUCTOR FILM)

- ETCHING SEMICONDUCTOR a-Si FILM

- SPUTTERING Cr FILM FOR DATA WIRING AND DRAIN WIRING

- THIRD PHOTO-PROCESS(DATA WIRING AND DRAIN WIRING)

- ETCHING Cr FILM

- CVD OF Si-N PROTECTIVE FILM ( PROCESS FLOW )

FIG. 10

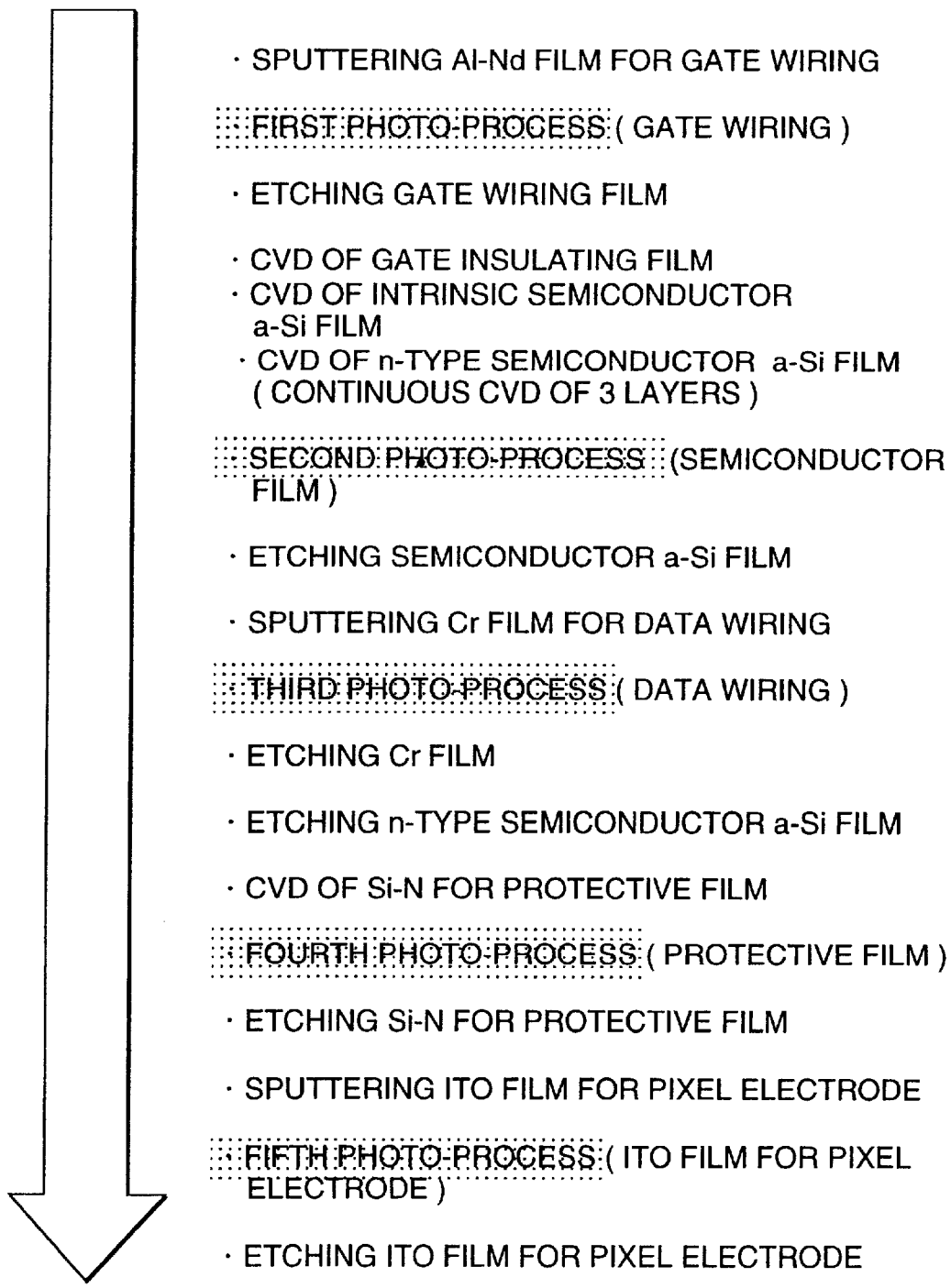

- SPUTTERING Al-Nd FILM FOR GATE WIRING

- FIRST PHOTO-PROCESS ( GATE WIRING )

- ETCHING GATE WIRING FILM

- CVD OF GATE INSULATING FILM
- CVD OF INTRINSIC SEMICONDUCTOR a-Si FILM
- CVD OF n-TYPE SEMICONDUCTOR a-Si FILM
  ( CONTINUOUS CVD OF 3 LAYERS )

- SECOND PHOTO-PROCESS (SEMICONDUCTOR FILM)

- ETCHING SEMICONDUCTOR a-Si FILM

- SPUTTERING Cr FILM FOR DATA WIRING

- THIRD PHOTO-PROCESS ( DATA WIRING )

- ETCHING Cr FILM

- ETCHING n-TYPE SEMICONDUCTOR a-Si FILM

- CVD OF Si-N FOR PROTECTIVE FILM

- FOURTH PHOTO-PROCESS ( PROTECTIVE FILM )

- ETCHING Si-N FOR PROTECTIVE FILM

- SPUTTERING ITO FILM FOR PIXEL ELECTRODE

- FIFTH PHOTO-PROCESS ( ITO FILM FOR PIXEL ELECTRODE )

- ETCHING ITO FILM FOR PIXEL ELECTRODE ( PROCESS FLOW )

FIG. 11 (a)
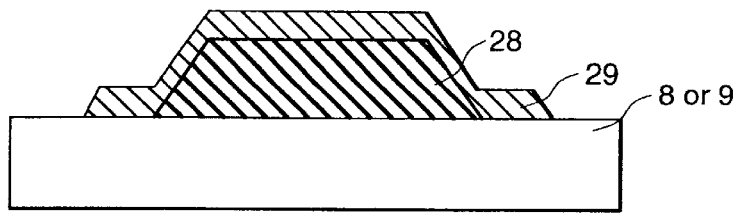
FIG. 11 (b)
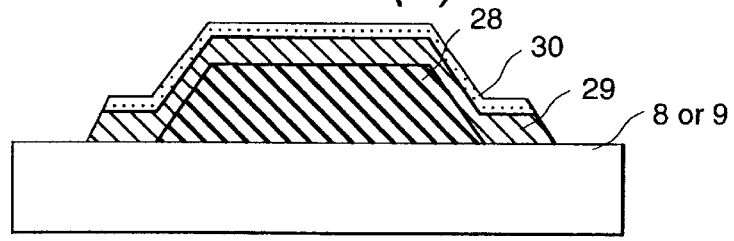
FIG. 11 (c-1)
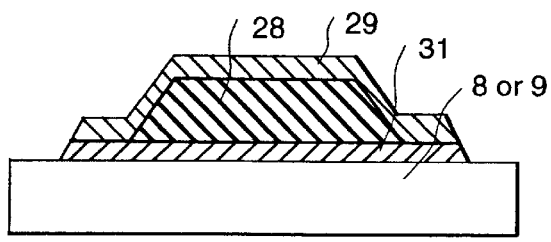
FIG. 11 (c-2)
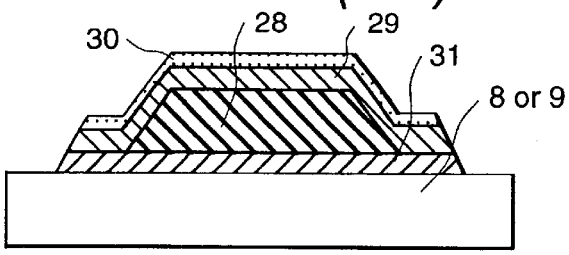
FIG. 11 (c-3)
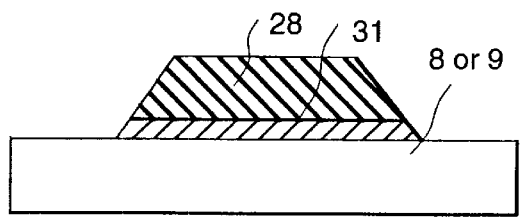

FIG. 12 (a)
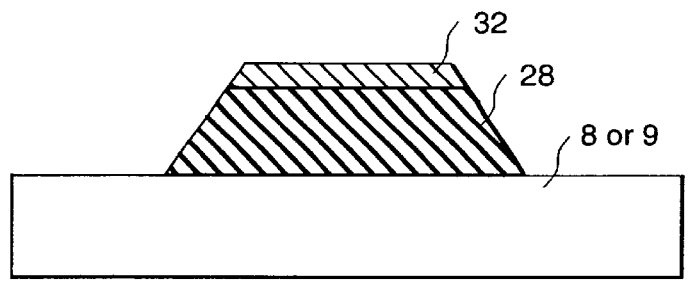
FIG. 12 (b)
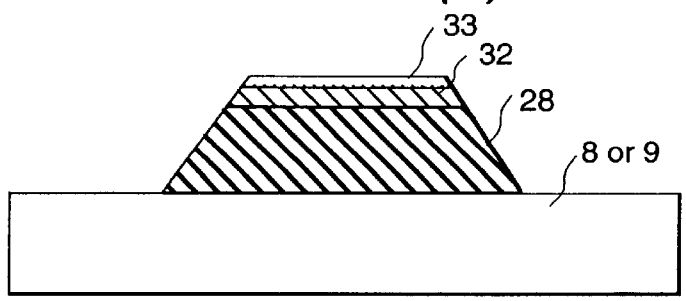
FIG. 12 (c-1)
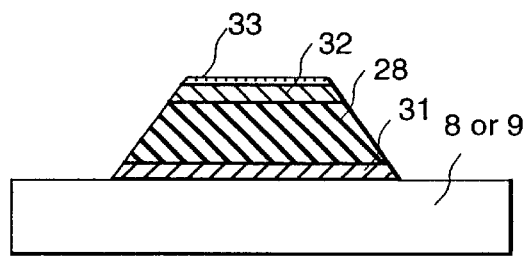
FIG. 12 (c-2)
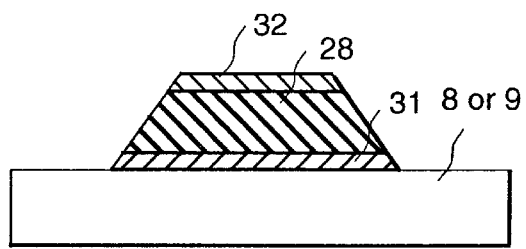

LIQUID CRYSTAL DISPLAY APPARATUS

BACKGROUND OF THE INVENTION

The present invention relates to a liquid crystal display apparatus and, more particularly, to an active matrix type liquid crystal display apparatus driven by thin film transistors.

As image display apparatuses capable of being made thin in thickness, light in weight and high in precision, market of thin film transistor drive liquid crystal display apparatuses (hereinafter, referred to as TFT-LCD) is growing wider compared to the conventional cathode lay tube displays. The TFT-LCD comprises gate wires and data wires formed on a glass substrate; thin film transistors, each of the transistors being formed at a position near an intersecting point of the gate wire and the data wire; pixel electrodes connected to the thin transistors; a gate insulator film; an insulating protective film; an opposite substrate; and a liquid crystal layer interposed between the glass substrate and the opposite substrate. With the recent trend of larger screen and higher precision of the TFT-LCD, requirement to improving properties of the wiring such as low resistivity, low stress, high workability is being increased. Metallic films are generally used for the gate wires and the data wires, but the conventional simple substance such as Al or Cr can not satisfy the requirement. Japanese Patent Application Laid-Open No. 5-184747 discloses that a film made of an Al—Nd alloy containing Nd composition of 5.1 to 48.5 wt % (1 to 15 at %) is employed for TFT-LCD wiring. In addition, Japanese Patent Application Laid-Open No.7-4555, Japanese Patent Application Laid-Open No.8-18060, Japanese Patent Application Laid-Open No.8-306693 and Japanese Patent Application Laid-Open No.1-289140 disclose Al—Nd alloys or lanthanide alloys. Further, Japanese Patent Application Laid-Open No.10-199827 discloses a laminated wiring of ITO and Al.

The TFT-LCD has an advantage that it is thin in thickness and light in weight compared to the cathode lay tube type display apparatus, but has a problem in that its production yield is likely decreased and its cost is high because number of its manufacturing processes is large and its structure is complex. In detail, the TFT-LCD has a structure composed of plural kinds of thin films such as scanning signal wires (gate wiring films), a gate insulator film, a semiconductor film, data wires (source, drain wiring film), pixel electrode films, opposite electrode films, an insulator protective film and so on having a thickness of several tens to several hundreds nano-meters on a TFT substrate. The thin films are formed through a photo-lithographic process, and it is difficult to attain a high accuracy in the patterning work over the whole area and to suppress occurrence of short-circuiting between the electrodes and break in the wiring. In addition, the basic property of the wiring in connection with the larger screen and the high precision is required to be a low resistance so as to eliminate unevenness in display. This requirement can be satisfied by using a low resistivity wiring material or by using thick wires since the resistance is in direct proportion to a resistivity of the wiring material and in inverse proportion to a thickness of the film. It is ideal that the wiring material is of a low resistivity, but actually, the resistivity of the general wiring material is not satisfactorily low. Therefore, the low resistance wire capable of eliminating unevenness of display in a TFT-LCD can be attained by using thick wires. In a case of using the thick wires, it is important that edge portions of the wire are formed in a forward tapering shape. Here, the forward tapering shape means a shape that a cross-sectional shape of the wire formed on a substrate is wider in the interface between the wire and the substrate and narrower in the obverse surface side opposite to the substrate side of the wire. The TFT-LCD includes a structure that an insulator film is interposed between a lower electrode and an upper electrode. Particularly, in a case where the forward tapering shape can not formed in the lower electrode, an insulating property of the insulator film is deteriorated in a portion of the insulator film covering a step of the lower electrode, and short-circuiting between the lower electrode and the upper electrode may occur, which is one of main causes to decrease the manufacturing yield of the TFT-LCD.

Aluminum is a low resistivity and low stress material. However, thermal stress is apt to cause hillocks because of the low melting point, and accordingly a problem of short-circuiting is apt to cause even on the surface of the wire. As a material which makes use of the low resistivity and low stress of aluminum and is difficult to cause the hillocks, Japanese Patent Application Laid-Open No.5-184747 discloses that the Al—Nd alloy containing Nd composition of 5.1 to 48.5 wt % (1 to 15 at %) is employed for TFT-LCD wiring. However, in a case where the wires are made thicker with the trend of a larger screen and a higher precision, the manufacturing yield of the TFT-LCD will be decreased due to the problem in that short-circuiting between the upper and lower electrodes occurs at the position of the insulator film covering the step in the lower electrode, and due to a problem in that a defect occurs in the upper electrode pattern by penetration of an etching solution for treating the upper electrode into cracks in the insulator film deteriorated its insulating property of the insulator film during patterning treatment of the upper electrode. That is, the alloy satisfies the hillock resistance, but improvement of the manufacturing yield is not taken into consideration.

SUMMARY OF THE INVENTION

An object of the present invention is to provide a liquid crystal display apparatus capable of eliminating short-circuiting between electrodes and improving the manufacturing yield by forming a wire in a good forward tapering shape even if thickness of the wire is thickened so as to eliminate unevenness in display.

The present invention is characterized by the following.

(1) A liquid crystal display apparatus comprises a plurality of gate wires; a plurality of data wires formed so as to intersect the plurality of gate wires; thin film transistors, each of the thin film transistors being formed at a position near an intersecting point between the gate wire and the data wire; a substrate having the gate wires, the data wires and the thin film transistors; an opposite substrate placed opposite to substrate; and a liquid crystal layer interposed between the substrate and the opposite substrate, wherein at least one kind of the gate wire and the data wire is made of an Al alloy composed by adding Nd of 1 to 4.5 weight % to Al, and an taper angle in an edge portion shape of the wire is 40 to 55 degrees.

(2) A liquid crystal display apparatus described in the item (1), wherein the Al alloy wire is coated with a film made of another kind of metal.

(3) A liquid crystal display apparatus described in the item (1), wherein the Al alloy wire is of a laminated structure having an upper layer made of another kind of metal.

(4) A liquid crystal display apparatus described in any one of the items (1) to (3), wherein the Al alloy wire is of a laminated structure having a lower layer made of another kind of metal.

(5) A liquid crystal display apparatus described in any one of the items (2) to (4), wherein the coating layer or the upper layer is made of a material selected from the group consisting of Cr and alloys containing Cr as a main component and added with at least one element of W, Mo, Ti and Ta.

(6) A liquid crystal display apparatus described in any one of the items (2) to (4), wherein the coating layer or the upper layer is made of a material selected from the group consisting of Mo and alloys containing Mo as a main component and added with at least one element of W, Cr, Ti and Ta.

(7) A liquid crystal display apparatus described in any one of the items (2) to (4), wherein the coating layer or the upper layer is made of a material selected from the group consisting of W, Ti and Ta.

(8) A liquid crystal display apparatus described in any one of the items (2) to (4), wherein the coating layer or the upper layer is of a double-layer laminated layer.

(9) A liquid crystal display apparatus described in the item (8), wherein the coating layer or the upper layer of the double-layer laminated layer has a lower film made of chromium and an upper film made of an alloy containing chromium as a main component and added with at least one element of W, Mo, Ti and Ta.

(10) A liquid crystal display apparatus described in the item (4) or (9), wherein the lower layer is made of a material selected from the group consisting of Cr and alloys containing Cr as a main component and added with at least one element of W, Mo, Ti and Ta.

(11) A liquid crystal display apparatus described in the item (4) or (9), wherein the lower layer is made of a material selected from the group consisting of Mo and alloys containing Mo as a main component and added with at least one element of W, Cr, Ti and Ta.

(12) A liquid crystal display apparatus described in the item (4) or (9), wherein the lower layer is made of a material selected from the group consisting of W, Ti and Ta.

(13) A liquid crystal display apparatus described in any one of the items (1) to (12), which comprises source wires, each of the source wires being connected to the transistor; and common wires, each of the common wires being arranged opposite to the source wire, wherein at least one of the gate wire, the data wire, the source wire and the common wire comprises the Al alloy wire.

(14) A liquid crystal display apparatus described in any one of the items (1) to (12), which comprises source wires, each of the source wires being connected to the transistor, wherein at least one of the gate wire, the data wire and the source wire comprises the Al alloy wire.

(15) A liquid crystal display apparatus described in any one of the items (1) to (12), which comprises transparent pixel electrodes, each of the transparent pixel electrode being connected to the transistor; and common transparent electrodes arranged on the opposite substrate.

(16) A liquid crystal display apparatus described in any one of the items (13) to (15), wherein the Al alloy wire has a wiring width narrower than a width of the lower layer and wider than a width of the upper layer.

Since pure aluminum is large in grain size because of a low melting point, the large grains are removed during etching. Therefore, the tapered surface is very rough and the taper angle is 80 to 85 degrees in average. An Al-0.5 wt %Nd alloy does not have enough impurity of Nd content to make the grain smaller, and accordingly the large taper angle of pure aluminum characteristic remains. However, an Al-(1~4.5 wt %)Nd alloy is small in grain size, and since the film surface (in a side near the resist) is immersed in an etching solution for a long time, etching is progressed in the lateral direction. Therefore, isotropic etching is progressed to form a tapered shape having a taper angle near 50 degrees. In an Al-5wt %Nd alloy, the impurity content of Nd is excessively high to cause uneven distribution of the compositions. Therefore, grains of aluminum rich portions and neodymium rich portions are selectively removed, and accordingly etching is not isotropically progressed and the taper angle is increased to 65 to 70 degrees.

The present invention is not limited to the above description, and features of the present invention will be further described below.

BRIEF DESCRIPTION OF DRAWINGS

FIG. 6 is a flowchart showing a thin film transistor manufacturing process of a liquid crystal display apparatus of an in-plane electric field liquid crystal driving type.

FIG. 10 is a flowchart showing a thin film transistor manufacturing process of a liquid crystal display apparatus of a vertical electric field liquid crystal driving type.

FIG. 11 is cross-sectional views showing Al alloy wires having a coating layer.

FIG. 12 is cross-sectional views showing Al alloy wires of a laminated wiring structure.

DESCRIPTION OF THE PREFERRED EMBODIMENTS

Figure 1A:
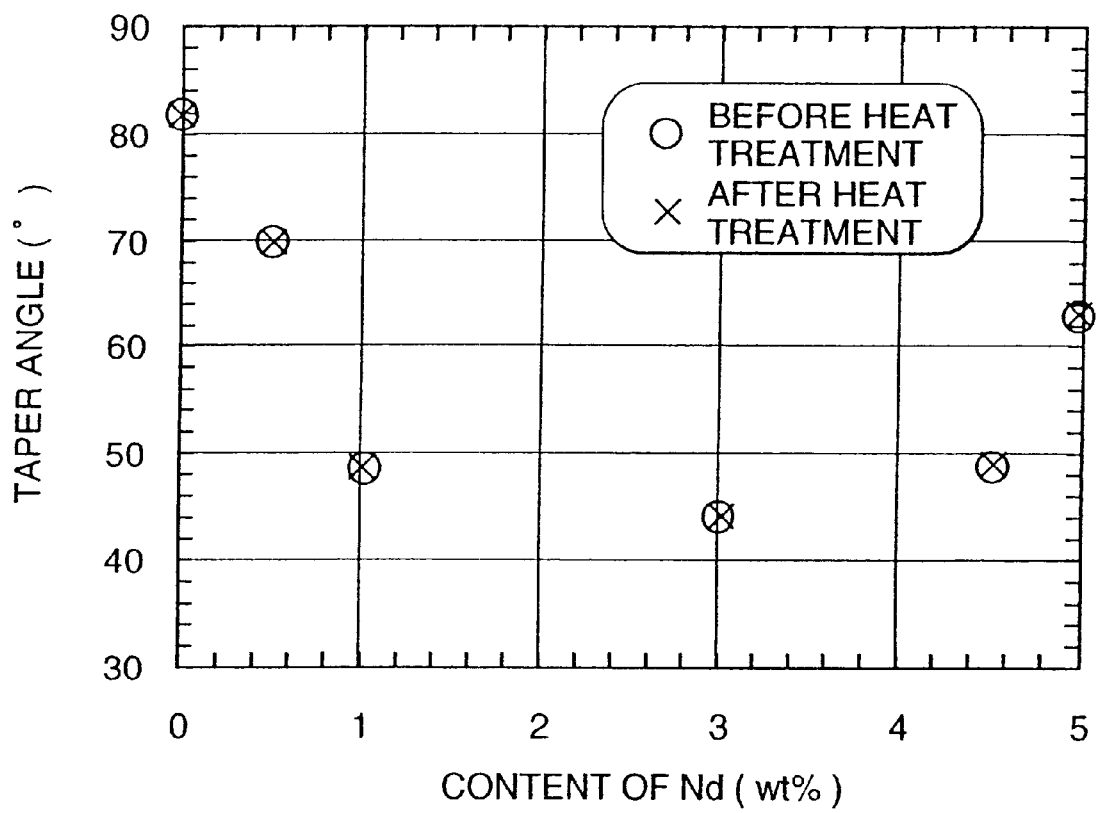
FIG. 1 is a graph showing the Nd content dependence of taper angle of an Al—Nd alloy film.

Initially, some of reference characters to be used in the accompanied drawings will be described below.

1 . . . gate wire, 2 . . . data wire, 3 . . . black matrix shielding film, 4 . . . transparent pixel electrode, 5 . . . intrinsic semiconductor layer, 6 . . . drain electrode, 7 . . . through hole, 8 . . . TFT glass substrate, 9 . . . gate insulator film, 10 . . . n-type semiconductor, 11 . . . protective film, 12 . . . alignment film, 13 . . . opposite glass substrate, 14 . . . color filter, 15 . . . opposite substrate protective film, 16 . . . common transparent electrode, 17 . . . opposite substrate alignment film, 18 . . . liquid crystal layer, 19 . . . polarizing plate, 20 . . . opposite polarizing plate, 21 . . . opposite electrode, 22 . . . TFT element, 23 . . . seal pattern, 24 . . . seal opening portion, 25 . . . screen portion, 26 . . . gate terminal cluster, 27 . . . data terminal cluster, 28 . . . Al—Nd alloy wire, 29 . . . coating layer, 30 . . . coating layer (second layer), 31 . . . lower layer, 32 . . . upper layer, 33 . . . upper layer (second layer).

In regard to Al—Nd alloy films made of Al and Nd as main components, fundamental characteristics of wiring material important for a liquid crystal display apparatus such as resistivity, film stress, reflectance, taper shape in the cross section after wire pattern processing were studied. The result will be described below.

(Embodiment 1)

Al—Nd alloy films having a thickness of 3000 Å were formed on glass substrates through a DC sputtering method using a target, target compositions of Al alloy targets containing Nd of 0, 0.5, 2, 3, 4.5, 5 wt % under film forming conditions of 3 kW power, 0.3 Pa argon pressure, and 20, 120, 215° C. substrate temperature. A resist pattern was formed to the obtained film through a photo-lithographic method, and then a wiring pattern was formed by selectively etching the Al—Nd alloy films using a mixed acid (mainly consist of phosphoric acid).

Observation of taper angle of the wiring pattern and hillocks, and measurement of resistivity, reflectance, stress of the film before and after heat treatment (300° C., 30 minutes in a nitrogen atmosphere) were performed.

Figure 1B:
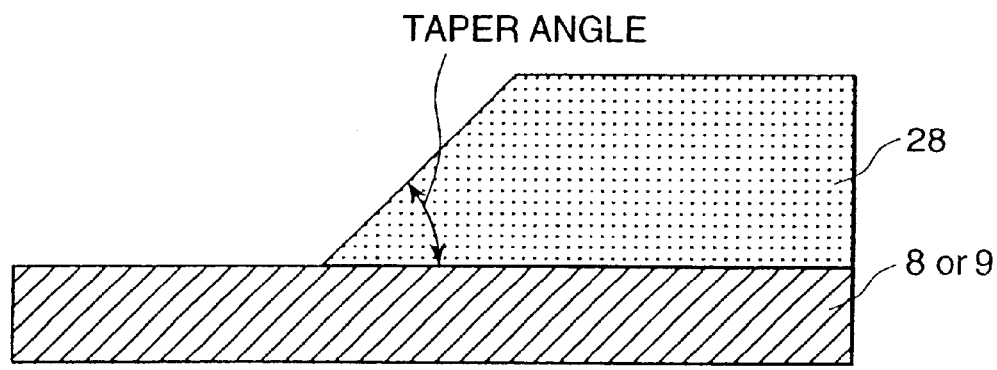

FIG. 1 shows an observed result of the taper angles in the edge portions of the Al—Nd alloy films. There is no change in the taper angles before and after the heat treatment. It can be understood that the forward tapering shape having a taper angle larger than 40 degrees and smaller than 55 degrees can be obtained when the Nd content is 1 wt % to 4.5 wt %. It was observed that when the Nd content was further increased, the diameter of hillocks was decreased and the density of the hillocks was decreased. It was also clarified that the density of the hillocks could be reduced down to a level having no problem in practical use when the Nd content was above 1 wt %. Wiring pattern was formed by forming an SiN insulator film having 350 nm thickness in the glass substrate at substrate temperature of 300° C. using a plasma CVD apparatus and then forming an Al—Nd alloy film on the SiN insulator film. The taper angle in the edge portions of the Al—Nd alloy wiring pattern was observed, and it was confirmed that the same result could be obtained.

Figure 2:
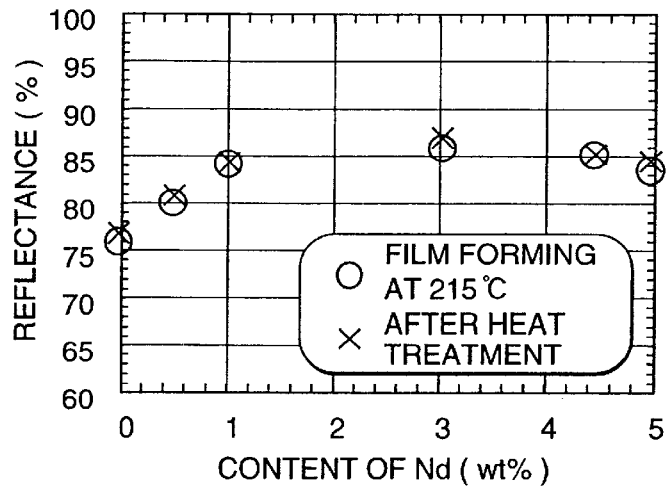
FIG. 2 is graphs showing the Nd content dependence and substrate temperature dependence of reflectance of an Al—Nd alloy film.
Figure 2:
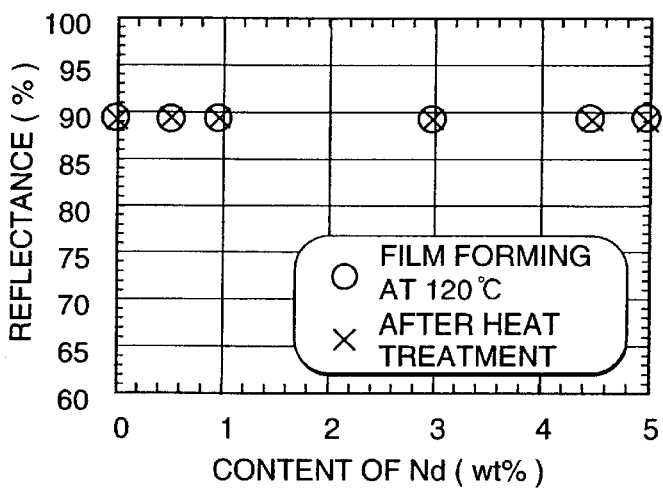
Figure 2:
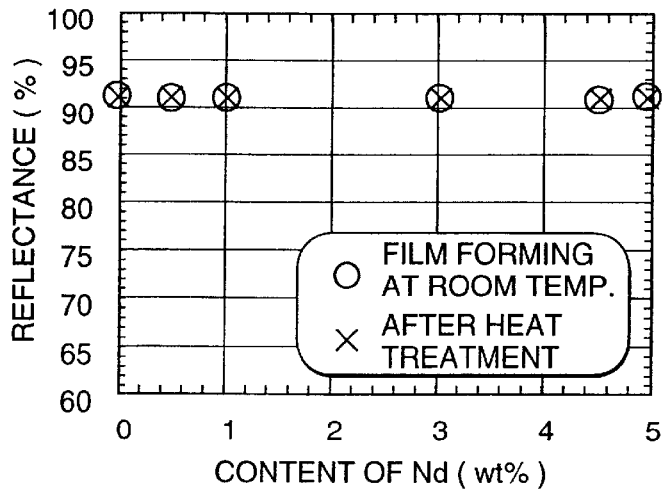

The size and the density of hillocks are factors characterizing the hillocks. Therefore, films made of Al—Nd alloys of various contents of Nd were fabricated at film forming temperatures of 215, 120 and 20° C., and reflectance of the films in wavelength 550 nm was measured as an index expressing unevenness caused by the hillocks. The result of measured reflectance is shown in FIGS. 2(a), (b) and (c). It can be understood from the figure that over all the contents of Nd, the reflectance is higher due to smaller unevenness of the film surface as the film forming temperature is lower, and change in the reflectance can not be observed before and after the heat treatment. In addition, it can be also understood from FIG. 2(a) that the reflectance in the Nd content range of 1 wt % to 4.5 wt % is higher then that of pure aluminum due to improvement in the evenness though the amount of hillocks are slightly large. This corresponds to that the grain size of the film is small, and the hillocks on the film surface are suppressed down to a level having no problem in practical use, and the taper angle falls in the range larger than 40 degrees and smaller than 55 degrees.

Figure 3:
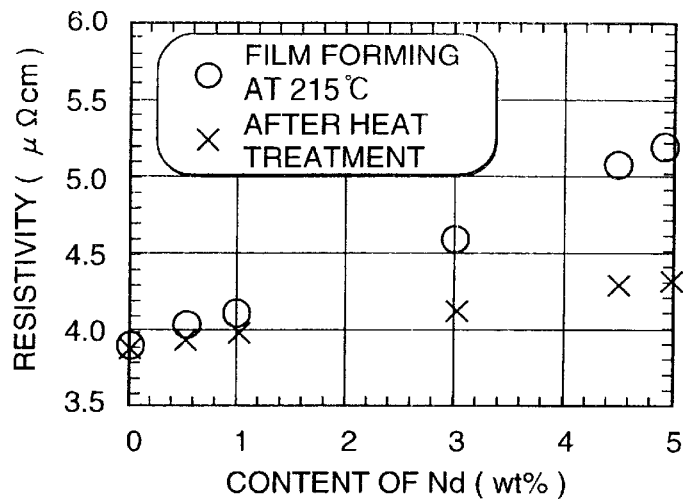
FIG. 3 is graphs showing the Nd content dependence and substrate temperature dependence of resistivity of an Al—Nd alloy film.
Figure 3:
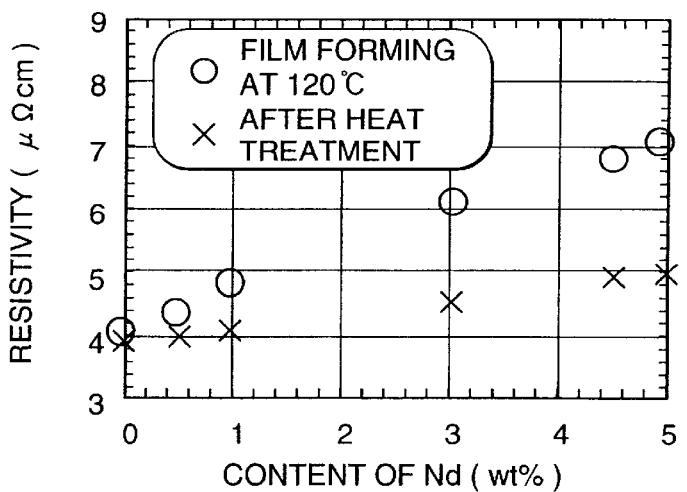
Figure 3:
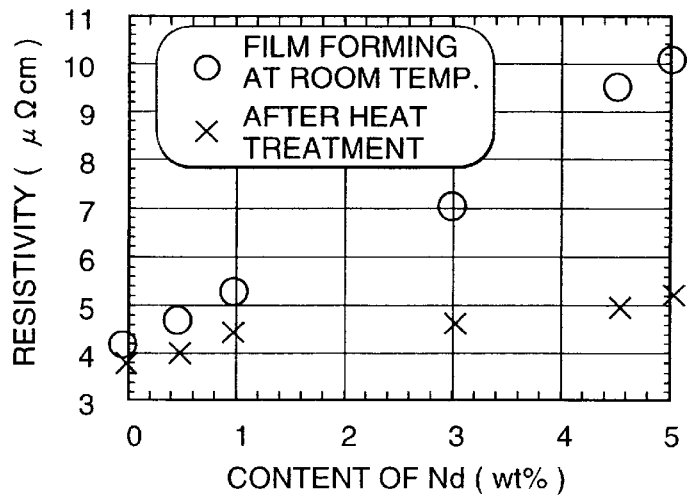

Films made of Al—Nd alloys of various contents of Nd were fabricated at film forming temperatures of 215, 120 and 20° C., and sheet resistance of the films was measured at room temperature through a four-terminal method before and after the heat treatment, and then values of resistivity were calculated from the sheet resistance and the film thickness. The result of calculated resistivity is shown in FIGS. 3(a), (b) and (c). Before the heat treatment, the values of resistivity of the Al—Nd alloys in each film forming temperature become smaller as the Nd content is decreased. It can be understood that the values of resistivity after the heat treatment are substantially decreased compared to those before the heat treatment, and the values of resistivity itself become smaller as the Nd content is decreased.

Films made of Al—Nd alloys of various contents of Nd were formed on Si substrates under the film forming condition described above, and film stresses were measured. The measured result showed that the film stresses in all the Nd contents were increased as the film forming substrate temperature was increased as 20° C., 120° C. and 215° C., and the film stress was increased as the Nd content was increased. It is preferable that the film stress is small. The film stress for Nd content of 5 wt % and film forming temperature of 215° C. exceeded 300 MPa at which film peeling occurred. Therefore, it is necessary that the Nd content is not larger than 4.5 wt %.

An Al—Nd alloy wiring pattern was formed on a glass substrate or on an insulator film on a glass substrate having a metallic lower layer made of Cr, Cr—W, Cr—Mo, Cr—Ti, Cr—Ta, Mo, Mo—W, Mo—Cr, Mo—Ti, Mo—Ta, W, Ti or Ta, respectively, and a taper angle in a edge portion of the Al—Nd alloy wiring pattern was observed. It was confirmed from the observation that each of the taper shapes had a taper angle within the range from 40 to 55 degrees when the Nd content of the Al—Nd alloy was within the range from 1 to 4.5 wt %.

Similarly, an Al—Nd alloy wiring pattern was formed after etching a metallic upper layer made of Cr, Cr—W, Cr—Mo, Cr—Ti, Cr—Ta, Mo, Mo—W, Mo—Cr, Mo—Ti, Mo—Ta, W, Ti or Ta on a glass substrate or on an insulator film on a glass substrate into a wiring pattern, respectively, and a cross-sectional shape of the Al—Nd alloy wiring pattern was observed. It was confirmed from the observation that each of the taper shapes had a taper angle within the range from 40 to 55 degrees when the Nd content of the Al—Nd alloy was within the range from 1 to 4.5 wt %.

Further, an Al—Nd alloy wiring pattern was formed after etching a metallic upper layer made of Cr, Cr—W, Cr—Mo, Cr—Ti, Cr—Ta, Mo, Mo—W, Mo—Cr, Mo—Ti, Mo—Ta, W, Ti or Ta on a glass substrate or on an insulator film on a glass substrate having a metallic lower layer made of Cr, Cr—W, Cr—Mo, Cr—Ti, Cr—Ta, Mo, Mo—W, Mo—Cr, Mo—Ti, Mo—Ta, W, Ti or Ta, respectively, into a wiring pattern in advance, respectively, and a cross-sectional shape of the Al—Nd alloy wiring pattern was observed. It was confirmed from the observation that each of the taper shapes had a taper angle within the range from 40 to 55 degrees when the Nd content of the Al—Nd alloy was within the range from 1 to 4.5 wt %.

(Embodiment 2)

Successively, short-circuiting defects between a gate wire and a data wire in connection with an insulation defect of an inter layer insulator film between the gate wire and the data wire caused by across-sectional shape of the gate wire was evaluated by actually applying the Al—Nd alloy film to gate wires in a liquid crystal display apparatus of an in-plane electric field liquid crystal driving type. Here, the in-plane electric field liquid crystal driving method means a method that a liquid crystal molecules are driven by applying an electric field in a direction parallel to glass substrate surfaces sandwiching the liquid crystal, and the method has an advantage in that the view angle can be widened.

Figure 4:
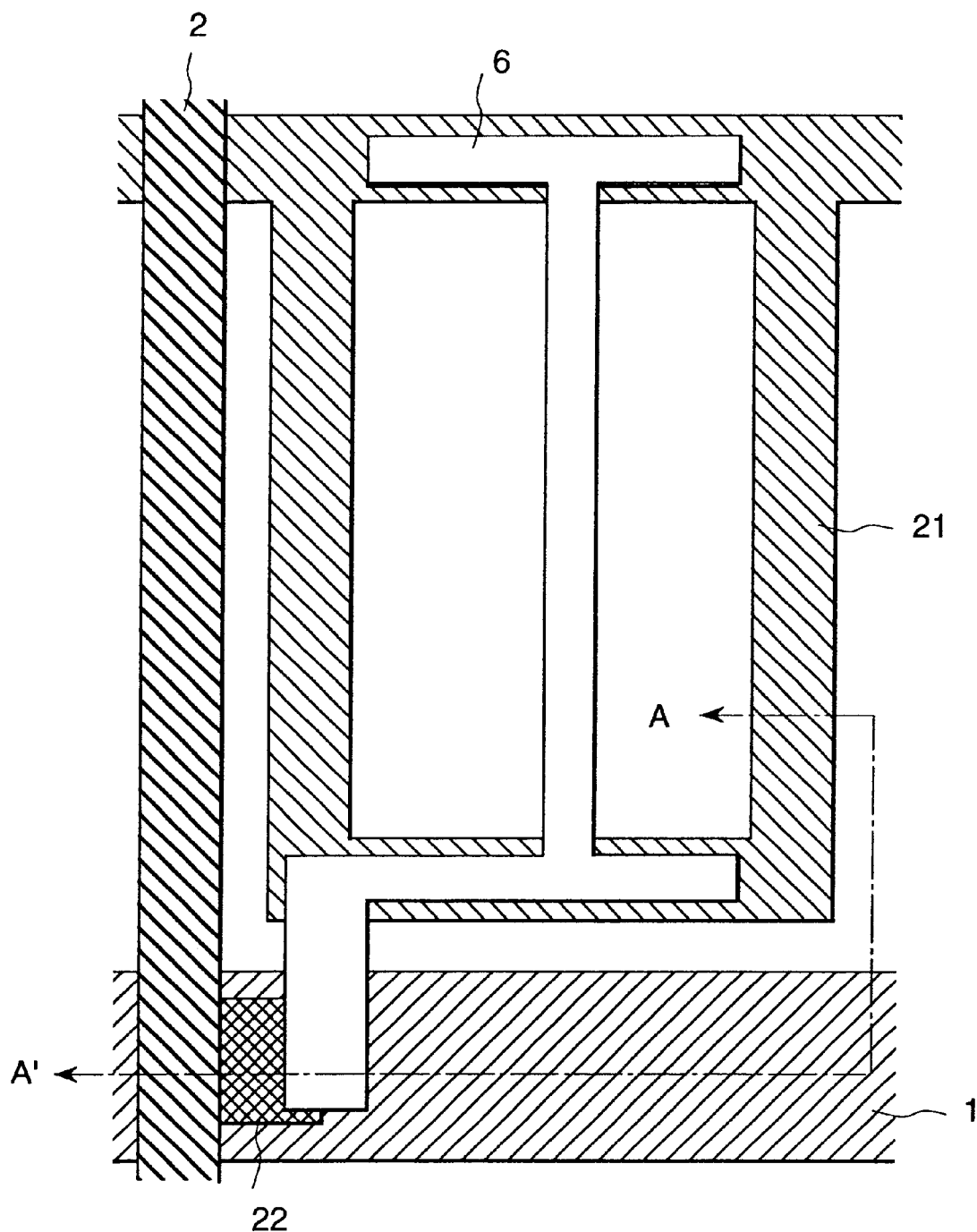
FIG. 4 is a plan view showing one pixel and its vicinity in a liquid crystal display apparatus of an in-plane electric field liquid crystal driving type.

FIG. 4 shows a plane pattern of one pixel and its vicinity in the manufactured liquid crystal display apparatus. The figure shows constituent elements of the pixel, that is, a gate wire 1, an opposite electrode 21, a data wire 2, a drain electrode 6 and a thin film transistor (TFT) 22. The opposite electrode 21 is, however, formed from the identical film from which the gate wire 1 is formed through a photo-lithographic method, and the drain electrode 6 is formed from the identical film from which the data wire 2 is formed through a photo-lithographic method.

Figure 5:
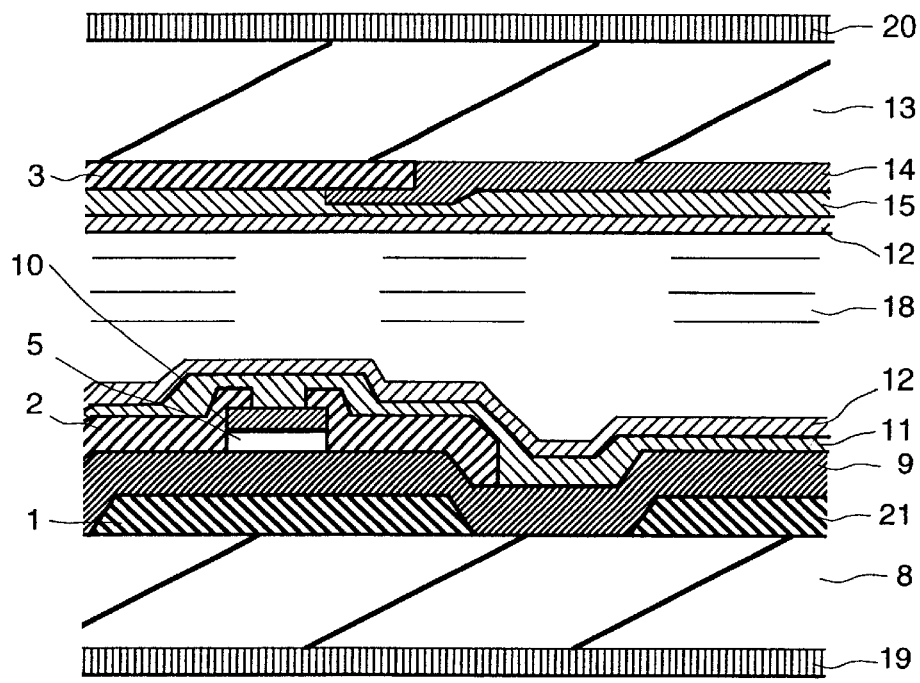
FIG. 5 is a cross-sectional view being taken on the plane of the line A–A' of FIG. 4.

FIG. 5 is a cross-sectional view being taken on the plane of the line A–A' of FIG. 4. The display panel is composed of a TFT glass substrate 8 having the gate wire 1, the opposite electrode 21, a gate insulator film 9, an intrinsic semiconductor 5, an N-type semiconductor 10, the data wire 2, the drain electrode 6, a protective film 11 and an alignment film 12 on one surface; an opposite glass substrate 13 having a color filter 14, a black matrix 3, an opposite substrate protective film 15 and an opposite substrate alignment film 17 on one surface; a liquid crystal layer 18 interposed between the TFT glass substrate and the opposite glass substrate 13; a polarizing plate 19; and an opposite polarizing plate 20.

FIG. 6 is a flowchart of the manufacturing process. Initially, an Al—Nd alloy film having a thickness of 300 nm was formed over the whole surface in one side of a transparent glass substrate (the TFT glass substrate 8) through the DC sputtering method. Temperature of the substrate was set to 215° C. Contents of Nd were set to 0, 0.5. 1, 3, 4.5 and 5 wt %. A first photo-process (a process composed of applying a photoresist, performing selective pattern exposure using a mask, and performing pattern development: this process is hereinafter referred to as photo-process) was performed on the Al—Nd alloy film. After that, patterns of the gate wire 1 and the opposite electrode 21 were formed by selectively etching the Al—Nd alloy films using a mixed acid (mainly consist of phosphoric acid). Next, on the pattern of the gate wire 1 and the opposite electrode 21 on the TFT glass substrate 8, the SiN gate insulator film 9 (350 nm thickness), the intrinsic semiconductor 5 (amorphous Si, 200 nm thickness) and the N-type semiconductor 10 (amorphous Si, 35 nm thickness) were successively formed by setting a substrate temperature to 300° C. using the plasma CVD apparatus. Then, a second photo-process was performed to pattern-work the intrinsic semiconductor 5 and the N-type semiconductor 10 through dry etching (using a mixed gas of CCl₃ and O₂). Successively, a Cr film having a thickness of 200 nm was formed through the DC sputtering method. A third photo-process was performed, and then the data wire 2 and the drain electrode 6 were formed by selectively etching the Cr alloy film using an aqueous solution of seric nitrate ammonium (15 wt %, 30° C.). Further, the SiN protective film 9 (a thickness of 500 nm) was formed using a plasma CVD apparatus.

Figure 7:
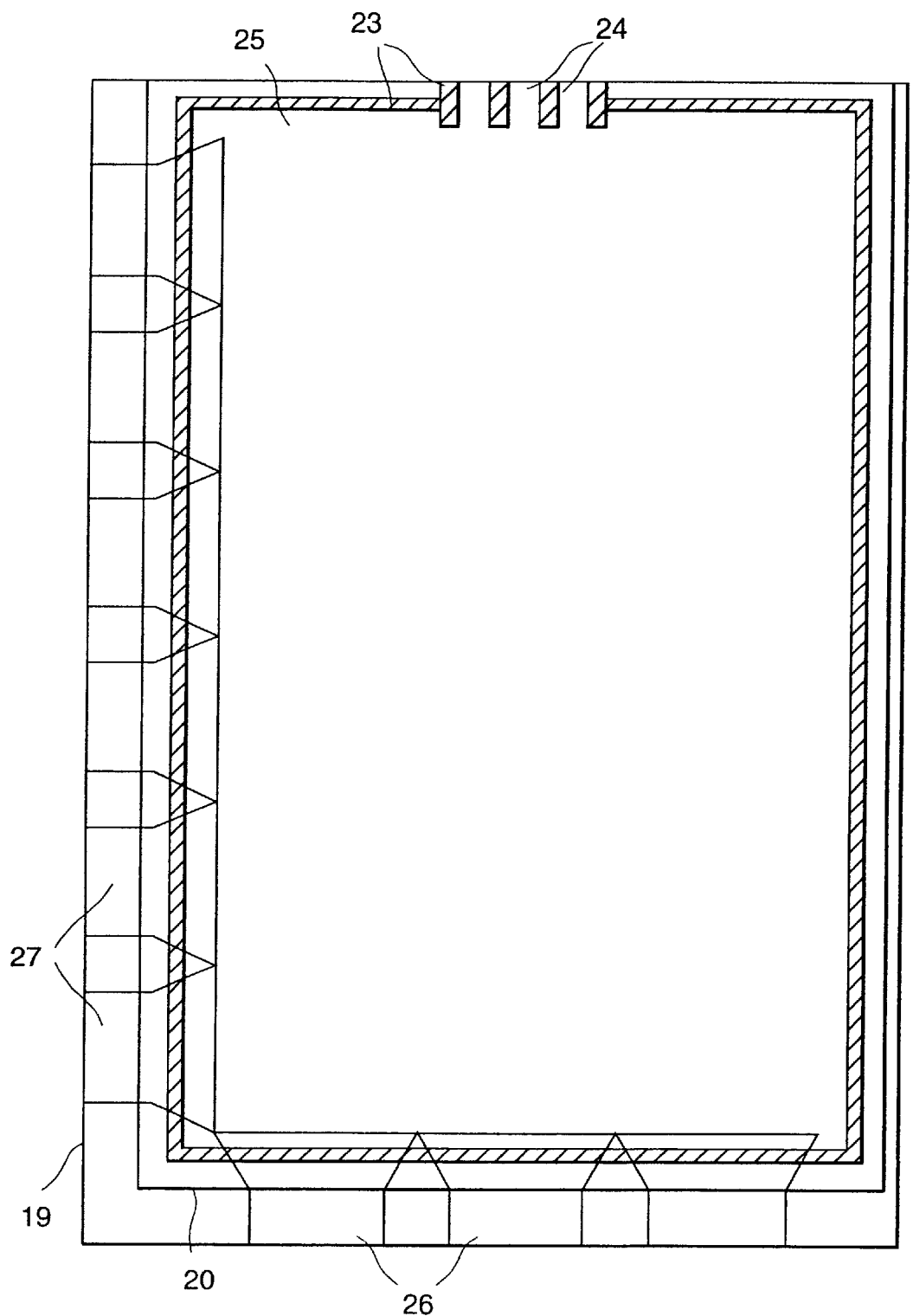
FIG. 7 is a schematic plan view showing a peripheral portion of a display panel.

FIG. 7 is a schematic plan view showing a peripheral portion of a display panel. When the display panel is fabricated, the liquid crystal is injected through an opening 24 in a seal pattern 23 which bonds the TFT glass substrate 8 and the opposite glass substrate 13 together. Gate terminal clusters 26 and data terminal clusters 27 are arranged in a screen portion 25 as shown in the figure. A plurality of gate wires 1 (scanning signal wires or horizontal signal wires) parallel to one another and a plurality of data wires 2 (video signal wires or vertical signal wires) parallel to one another formed so as to intersect with the gate wires 1 are formed on the TFT substrate 8.

A pixel area is an area surrounded by the two gate wires 1 adjacent to each other and the two data wires 2 adjacent to each other.

Table 1 shows an example of the insulation characteristic between the gate wire and the data wire in the liquid crystal panel manufacture as described above.

TABLE 1

| Content of Nd (wt % to Al) | Number of panels manufactured | Number of defect panels by short-circuiting |
| --- | --- | --- |
| 0 | 10 | 10 |
| 0.5 | 10 | 4 |
| 1 | 10 | 0 |
| 3 | 10 | 0 |
| 4.5 | 10 | 0 |
| 5 | 10 | 3 |

As shown in Table 1, when the Al—Nd alloys having the Nd contents of 1, 3, 4.5 wt % were used for the gate wires of the liquid crystal display apparatus, no insulation defect occurred between the gate wire and the data wire. The reason why the insulation characteristic is good is that since the taper angles of wires made of the Al—Nd alloys having the Nd contents of 1, 3, 4.5 wt % are below 55 degrees, the gate insulator film is well attached around onto the gate wire and cracks do not occur in the gate insulator film. In the other hand, in the cases of using the films made of the Al—Nd alloy having the Nd contents of 0 and 5 wt % cracks occur in the gate insulator film coating the gate wire to deteriorate the insulation characteristic, and consequently there occur many defects of short-circuiting between the gate wore and the data wire.

(Embodiment 3)

Successively, short-circuiting defects between a gate wire and a data wire in connection with an insulation defect of an inter layer insulator film between the gate wire and the data wire caused by across-sectional shape of the gate wire was evaluated by actually applying the Al—Nd alloy film to gate wires in a liquid crystal display apparatus of a vertical electric field liquid crystal driving type. Here, the vertical electric field liquid crystal driving method means a method that a liquid crystal molecules are driven by applying an electric field in a direction perpendicular to glass substrate surfaces sandwiching the liquid crystal.

Figure 9:
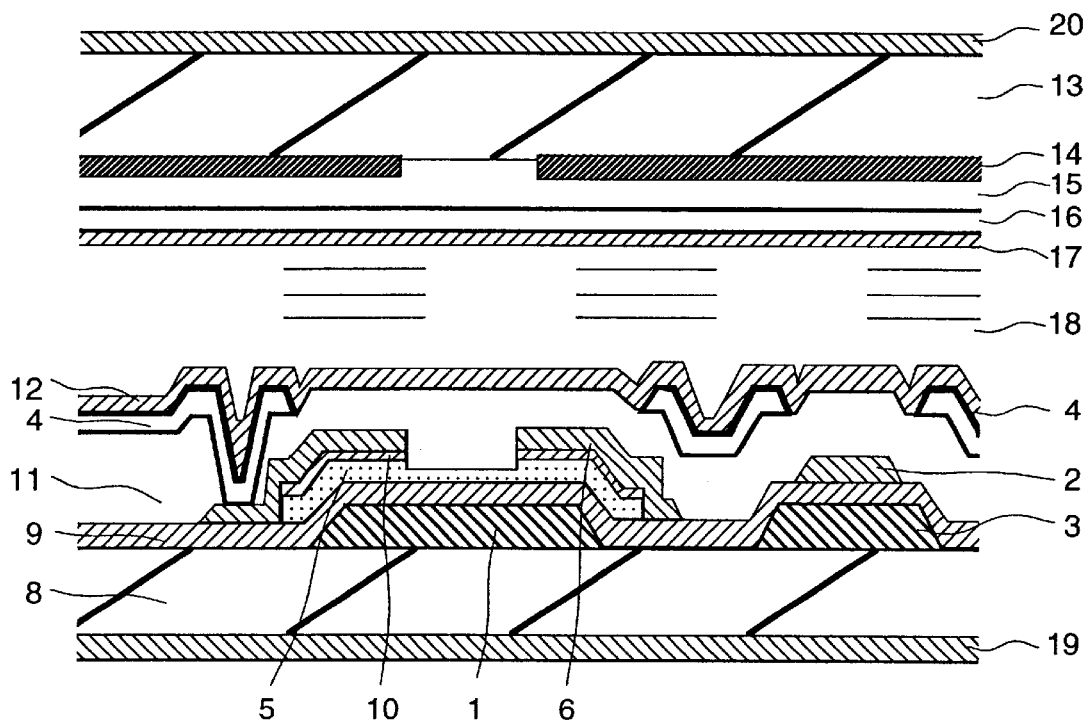
FIG. 9 is a cross-sectional view being taken on the plane of the line A–A' of FIG. 8.
Figure 8:
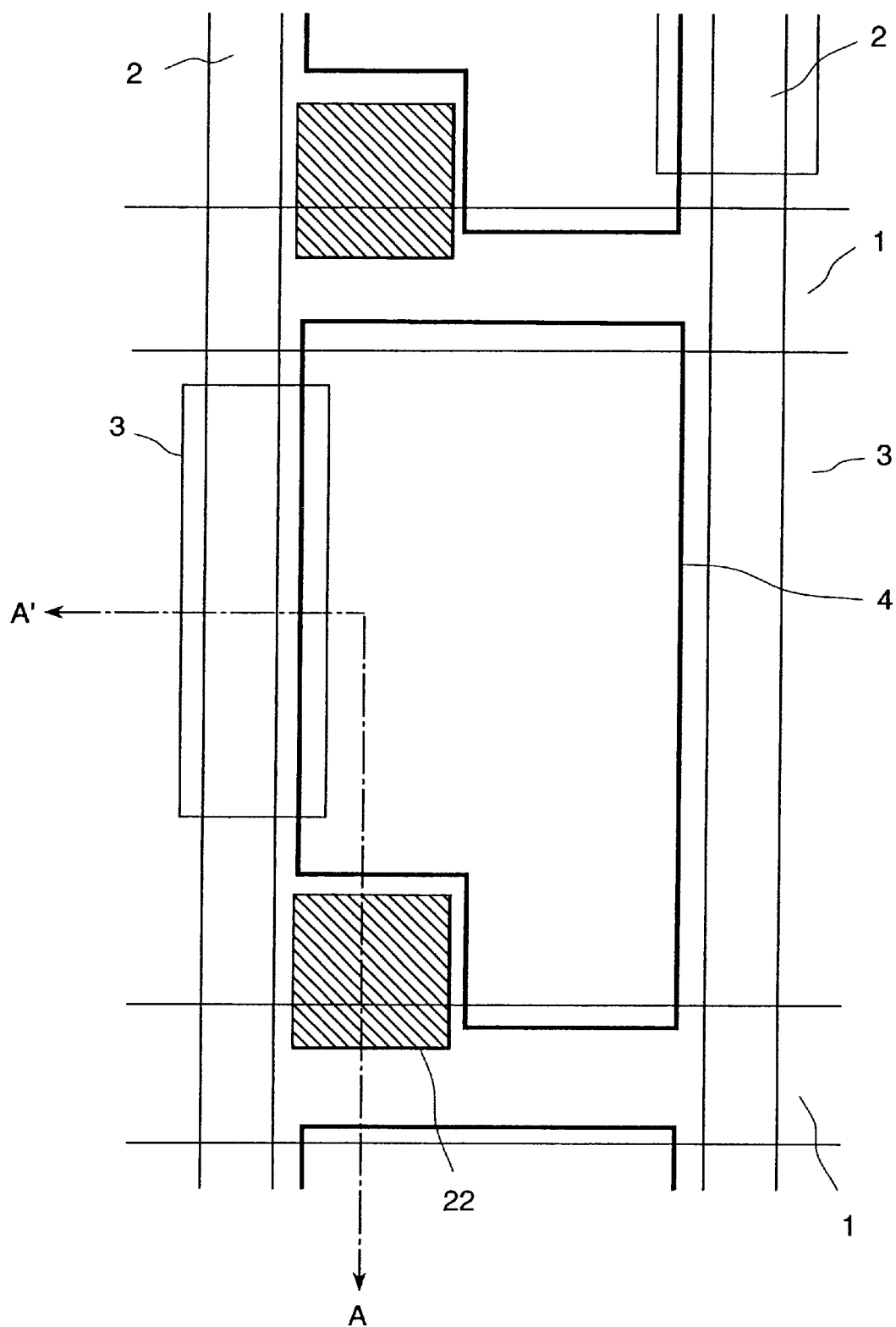
FIG. 8 is a plan view showing one pixel and its vicinity in a liquid crystal display apparatus of a vertical electric field liquid crystal driving type.

FIG. 8 shows a plane pattern of one pixel and its vicinity in the manufactured liquid crystal display apparatus. The figure shows constituent elements of the pixel, that is, a gate wire 1, a data wire 2, a black matrix shielding film 3, a transparent pixel electrode 4, an intrinsic semiconductor layer 5, a drain electrode 6 and a through hole 7. FIG. 9 is a cross-sectional view being taken on the plane of the line A–A' of FIG. 8. The display panel is composed of a TFT glass substrate 8 having the gate wire 1, a gate insulator film 9, the intrinsic semiconductor 5, an N-type semiconductor 10, the data wire 2, a protective film 11, the transparent pixel electrode 4 and an alignment film 12 on one surface; an opposite glass substrate 13 having a color filter 14, an opposite substrate protective film 15, a common transparent electrode 16 and an opposite substrate alignment film 17 on one surface; a liquid crystal layer 18 interposed between the TFT glass substrate 8 and the opposite glass substrate 13; a polarizing plate 19; and an opposite polarizing plate 20.

FIG. 10 is a flowchart of the manufacturing process. Initially, an Al—Nd alloy film having a thickness of 300 nm was formed over the whole surface in one side of a transparent glass substrate (the TFT glass substrate 8) through the DC sputtering method. Temperature of the substrate was set to 215° C. Contents of Nd were set to 0, 0.5. 1, 3, 4.5 and 5 wt %. A first photo-process was performed on the Al—Nd alloy film. After that, patterns of the gate wire 1 and the black matrix shielding film 3 were formed by selectively etching the Al—Nd alloy films using a mixed acid (mainly consist of phosphoric acid). Next, on the pattern of the gate wire 1 and the black matrix shielding film 3 on the TFT glass substrate 8, the SiN gate insulator film 9 (350 nm thickness), the intrinsic semiconductor 5 (amorphous Si, 200 nm thickness) and the N-type semiconductor 10 (amorphous Si, 35 nm thickness) were successively formed by setting a substrate temperature to 300° C. using the plasma CVD apparatus. Then, a second photo-process was performed to pattern-work the intrinsic semiconductor 5 and the N-type semiconductor 10 through dry etching (using a mixed gas of $CCl_3$ and $O_2$).

Successively, a Cr film having a thickness of 200 nm was formed through the DC sputtering method. A third photo-process was performed, and then the data wire 2 was formed by selectively etching the Cr alloy film using an aqueous solution of seric nitrate ammonium (15 wt %, 30° C.), and the N-type semiconductor film 10 was patterned through dry etching (using a mixed gas of $CCl_3$ and $O_2$). Further, the SiN protective film 11 (a thickness of 500 nm) was formed using the plasma CVD apparatus.

In a fourth photo-process, the protective film 11 was etched to form the through hole 7 for exposing the data wire 2 on a spot. Therein, the transparent pixel electrode 4 made of indium oxide added with tin (ITO) was formed by a DC sputter apparatus. Substrate temperature was set to 215° C. and a mixed gas of Ar and $O_2$ was used as the sputter gas. In a fifth photo-process, the transparent pixel electrode 4 was formed into a predetermined pattern by etching the transparent pixel electrode 4 at 30° C. using HBr. Thus, the TFT substrate of the liquid crystal display apparatus was manufactured.

FIG. 7 is a schematic plan view showing a peripheral portion of a display panel. When the display panel is fabricated, the liquid crystal is injected through an opening 24 in a seal pattern 23 which bonds the TFT glass substrate 8 and the opposite glass substrate 13 together. Gate terminal clusters 26 and data terminal clusters 27 are arranged in a screen portion 25 as shown in the figure. A plurality of gate wires 1 (scanning signal wires or horizontal signal wires) parallel to one another and a plurality of data wires 2 (video signal wires or vertical signal wires) parallel to one another formed so as to intersect with the gate wires 1 are formed on the TFT substrate 8. A pixel area is an area surrounded by the two gate wires 1 adjacent to each other and the two data wires 2 adjacent to each other, and the transparent pixel electrodes 4 are formed over the whole surface of the screen portion.

Table 2 shows an inspected result of the insulation characteristic between the gate wire and the data wire in the liquid crystal panel manufacture as described above.

TABLE 2

| Content of Nd (wt % to Al) | Number of panels manufactued | Number of defect panels by short-circuiting |
|---|---|---|
| 0 | 10 | 10 |
| 0.5 | 10 | 5 |
| 1 | 10 | 0 |
| 3 | 10 | 0 |
| 4.5 | 10 | 0 |
| 5 | 10 | 6 |

As shown in Table 2, when the films made of the Al—Nd alloys having the Nd contents of 1, 3, 4.5 wt % were used as the gate wires having the forward tapering shape of the liquid crystal display apparatus, no defective panels due to insulation defect occurred between the gate wire and the data wire occurred because of the good insulation characteristic of the gate insulator films on the gate wires. In the other hand, in the cases of using the films made of the Al—Nd alloy having the Nd contents of 0 and 5 wt %, cracks occur in the gate insulator film coating the gate wire to deteriorate the insulation characteristic, and consequently there occur many defects of short-circuiting between the gate wire and the data wire.

(Embodiment 4)

Description will be made below on an embodiment in which the gate wire 1 and the opposite electrode 21 are coated with the other metals in a structure similar to that of Embodiment 2 or Embodiment 3. FIG. 11(*a*) shows a cross-sectional structure of an Al—Nd alloy wire 28 and a coating the layer 29 after wiring pattern work. Structures of the portions other than the gate wire 1 and the opposite electrode 21 are similar to those of FIG. 5 or FIG. 9. Description will be made below, referring to FIG. 5. An Al—Nd alloy film having a thickness of 300 nm was formed over the whole surface in one side of a transparent glass substrate (the TFT glass substrate 8) through the DC sputtering method. Temperature of the substrate was set to 215° C. Content of Nd was set to 3.0 wt %. A photo-process was performed on the Al—Nd alloy film. After that, a pattern of the Al—Nd alloy wire 28 was formed by selectively etching the Al—Nd alloy films using a mixed acid (mainly consist of phosphoric acid). A Cr-50 wt % Mo film having a thickness of 100 nm was formed on the Al—Nd alloy wire 28 though the DC sputtering method. Therein, a photo-process was performed, and then the Cr-50 wt % Mo film was selectively etched using an aqueous solution of seric nitrate ammonium. Thus, forming of the laminated gate wire 1 or the laminated opposite electrode 21 having a double layer structure shown in FIG. 11(*a*) was completed. Since the taper angle of the Al—Nd alloy wire 28 was controlled, the coating layer 29 could coat the Al—Nd alloy wire 28 with a good coverage.

Since such a coating layer provided on the Al alloy wire becomes a layer for preventing hillocks from growing to the Al alloy in which hillocks are apt to occur compared to a high melting point metal, the reliability of the wire can be improved.

Table 3 shows results of embodiment which are varied the composition of metals of the coating layer 29 in the same structure.

TABLE 3

| Composition of coating layer metal | Number of panels manufactued | Number of defect panels by short-circuiting |
|---|---|---|
| Cr | 10 | 0 |
| Cr—0.6 at % W | 10 | 0 |
| Cr—0.6 at % Mo | 10 | 0 |
| Cr—0.6 at % Ti | 10 | 0 |
| Cr—0.6 at % Ta | 10 | 0 |
| Cr—0.6 at % V | 10 | 0 |
| Cr-0.6 at % Nb | 10 | 0 |
| Mo | 10 | 0 |
| Mo—0.6 at % W | 10 | 0 |
| Mo—0.6 at % Cr | 10 | 0 |
| Mo—0.6 at % Ti | 10 | 0 |
| Mo—0.6 at % Ta | 10 | 0 |
| Mo—0.6 at % V | 10 | 0 |
| Mo—0.6 at % Nb | 10 | 0 |
| W | 10 | 0 |

TABLE 3-continued

| Composition of coating layer metal | Number of panels manufactued | Number of defect panels by short-circuiting |
|---|---|---|
| Ti | 10 | 0 |
| Ta | 10 | 0 |

As the inventors of the present invention have described in Japanese Patent Application 10-22978, when W or Mo having a lager atomic weight is added to Cr, the film stress is decreased compared to that of a Cr film. Further, in a case where a Cr film as the coating layer 29 and a Cr alloy as a coating layer (second layer) 30 are used to form a laminated layer as shown in FIG. 11(*b*), the edge portion becomes a forward tapering shape. That is, by using the wiring structure described above, it is possible to obtain a highly reliable wire without defects caused by short-circuiting.

In a case where the Al—Nd alloy wire in accordance with the present invention is employed in the data wire 2 or the drain electrode 7, Si atoms in the N-type semiconductor 10 and the gate insulator film 9 are diffused into Al. However, by arranging a lower layer 31 under the Al—Nd alloy wire 28 as shown in FIGS. 11(*c*-1), (*c*-2) and (*c*-3), the reliability could be further increased. The metals for the coating layer having the same metallic: compositions as those in Table 3 were used as metallic: material for the lower layer, and as a result the same effect could be obtained.

(Embodiment 5)

Description will be made below on an embodiment in which the gate wire 1 and the opposite electrode 21 are of a laminated layer structure in a structure similar to that of Embodiment 2 or Embodiment 3. FIG. 12(*a*) shows a cross-sectional structure of an Al—Nd alloy wire 28 and an upper layer 32 laminated on the Al—Nd alloy wire 28 after wiring pattern work. Structures of the portions other than the gate wire 1 and the opposite electrode 21 are similar to those of FIG. 5 or FIG. 9. Description will be made below, referring to FIG. 5. An Al—Nd alloy film having a thickness of 300 nm was formed over the whole surface in one side of a transparent glass substrate (the TFT glass substrate 8) through the DC sputtering method. Temperature of the substrate was set to 215° C. Content of Nd was set to 3.0 wt %. A Cr-50 wt %Mo film having a thickness of 100 nm was formed on the Al—Nd alloy film through the DC sputtering method. Then, a photo-process was performed on the Al—Nd alloy film. Therein, a photo-process was performed, and then the Cr-50 wt % Mo film was selectively etched using an aqueous solution of seric nitrate ammonium. After that, a laminated layer wiring pattern of the Al—Nd alloy wire 28 and the upper layer 32 were formed using a mixed acid (mainly consist of phosphoric acid). Thus, forming of the laminated gate wire 1 or the laminated opposite electrode 21 having a double layer structure shown in FIG. 12(*a*) was completed by once of photo-process. Since such a laminated layer provided on the Al alloy film becomes a layer for preventing hillocks from growing to the Al alloy in which hillocks are apt to occur compared to a high melting point metal, the reliability of the wire can be improved. In addition, since the laminated layer wiring structure can be fabricated by once of photo-process, it is advantageous in the manufacturing process to reduce number of processes.

Table 4 shows results of embodiment which are varied the composition of metals of the upper layer 32 in the same structure.

TABLE 4

| Composition of laminated layer metal | Number of panels manufactured | Number of defect panels by short-circuiting |
|---|---|---|
| Cr | 10 | 0 |
| Cr—0.6 at % W | 10 | 0 |
| Cr—0.6 at % Mo | 10 | 0 |
| Cr—0.6 at % Ti | 10 | 0 |
| Cr—0.6 at % Ta | 10 | 0 |
| Cr—0.6 at % V | 10 | 0 |
| Cr—0.6 at % Nb | 10 | 0 |
| Mo | 10 | 0 |
| Mo—0.6 at % W | 10 | 0 |
| Mo—0.6 at % Cr | 10 | 0 |
| Mo—0.6 at % Ti | 10 | 0 |
| Mo—0.6 at % Ta | 10 | 0 |
| Mo—0.6 at % V | 10 | 0 |
| Mo—0.6 at % Nb | 10 | 0 |
| W | 10 | 0 |
| Ti | 10 | 0 |
| Ta | 10 | 0 |

Further, in a case where the upper layer 32 as an upper layer and an upper layer (second layer) 33 are used to form a double upper layer as shown in FIG. 12(*b*), the edge portion becomes a forward tapering shape. That is, by using the wiring structure described above, it is possible to obtain a highly reliable wire without defects caused by short-circuiting.

In a case where the Al—Nd alloy wire in accordance with the present invention is employed in the data wire 2 or the drain electrode 7, by arranging a lower layer 31 under the Al—Nd alloy wire 28 as shown in FIGS. 12(*c*-1) and (*c*-2), the reliability could be further increased by the same reason described in Embodiment 4. The metals for the lower layer having the same metallic compositions as those in Table 4 were used as metallic material for the lower layer, and as a result the same effect could be obtained.

According to the present invention, it is possible to provide a liquid crystal display apparatus which has no defects, for example, caused by short-circuiting between the electrodes and has a high production yield.

What is claimed is:

1. A liquid crystal display apparatus comprising:
    a plurality of gate wires;
    a plurality of data wires formed so as to intersect said plurality of gate wires;
    thin film transistors, each of the thin film transistors being formed at a position near an intersecting point between a gate wire and a data wire;
    a first substrate having said gate wires, said data wires and said thin film transistors;
    an opposite substrate placed opposite to said first substrate; and
    a liquid crystal layer interposed between said first substrate and said opposite substrate, wherein
    at least one of said gate wires and said data wires is made of an Al alloy composed by adding Nd of 1 to 4.5 weight % to Al, and a taper angle in an edge portion of the wires is 40 to 55 degrees.

2. A liquid crystal display apparatus according to claim 1, wherein said Al alloy wire is coated with a film made of another kind of metal.

3. A liquid crystal display apparatus according to claim 1, wherein said Al alloy wire has a laminated structure having an upper layer made of another kind of metal.

4. A liquid crystal display apparatus according to any one of claim 1 to claim 3, wherein said Al alloy wire is of a laminated structure having a lower layer made of another kind of metal.

5. A liquid crystal display apparatus according to claim 2 wherein a coating layer is made of a material selected from the group consisting of Cr and alloys containing Cr as a main component and to which at least one element of W, Mo, Ti and Ta.

6. A liquid crystal display apparatus according to claim 2, wherein a coating layer is made of a material selected from the group consisting of Mo and alloys containing Mo as a main component and to which least one element of W, Cr, Ti and Ta is added.

7. A liquid crystal display apparatus according to claim 2, wherein a coating layer is made of a material selected from the group consisting of W, Ti and Ta.

8. A liquid crystal display apparatus according to claim 2, wherein a coating layer is of a double-layer laminated layer.

9. A liquid crystal display apparatus according to claim 8, wherein said double-layer laminated layer has a lower film made of Cr and an upper film made of an alloy containing Cr as a main component and to which at least one element of W, Mo, Ti and Ta is added.

10. A liquid crystal display apparatus according to claim 4, wherein said lower layer is made of a material selected from the group consisting of Cr and alloys containing Cr as a main component and to which at least one element of W, Mo, Ti and Ta is added.

11. A liquid crystal display apparatus according to claim 4, wherein said lower layer is made of a material selected from the group consisting of Mo and alloys containing Mo as a main component and to which at least one element of W, Cr, Ti and Ta is added.

12. A liquid crystal display apparatus according to claim 4, wherein said lower layer is made of a material selected from the group consisting of W, Ti and Ta.

13. A liquid crystal display apparatus according to claim 3, wherein said Al alloy wire has a wiring width narrower than a width of said lower layer and wider than a width of a upper layer thereof.

14. A liquid crystal display apparatus according to claim 3, wherein said upper layer is made of a material selected from the group consisting of Cr and alloys containing Cr as a main component and to which at least one element of W, Mo, Ti and Ta is added.

15. A liquid crystal display apparatus according to claim 3, wherein said upper layer is made of a material selected from the group consisting of Mo and alloys containing Mo as a main component and to which at least one element of W, Cr, Ti and Ta is added.

16. A liquid crystal display apparatus according to claim 3, wherein said upper layer is made of a material selected from the group consisting of W, Ti and Ta.

17. A liquid crystal display apparatus according to claim 3, wherein said upper layer is of a double-layer laminated layer.

18. A liquid crystal display apparatus according to claim 17, wherein said upper layer of the double-layer laminated layer has a lower film made of Cr and an upper film made of an alloy containing Cr as a main component and to which at least one element of W, Mo, Ti and Ta is added.

\* \* \* \* \*